United States Patent
New (10) Patent No.: US 8,296,578 B1
(45) Date of Patent: Oct. 23, 2012

(54) METHOD AND APPARATUS FOR COMMUNICATING DATA BETWEEN STACKED INTEGRATED CIRCUITS

(75) Inventor: Bernard J. New, Carmel Valley, CA (US)

(73) Assignee: Xilinx, Inc., San Jose, CA (US)

(*) Notice: Subject to any disclaimer, the term of this patent is extended or adjusted under 35 U.S.C. 154(b) by 532 days.

(21) Appl. No.: 12/534,587

(22) Filed: Aug. 3, 2009

(51) Int. Cl.
*G06F 12/14* (2006.01)

(52) U.S. Cl. .......................... 713/189; 326/38
(58) Field of Classification Search .................. 713/189; 326/38
See application file for complete search history.

(56) References Cited

U.S. PATENT DOCUMENTS

| | | |
|---|---|---|
| 5,162,260 A | 11/1992 | Leibovitz et al. |
| 5,270,261 A | 12/1993 | Bertin et al. |
| 5,323,060 A | 6/1994 | Fogal et al. |
| 5,327,327 A | 7/1994 | Frew et al. |
| 5,380,681 A | 1/1995 | Hsu |
| 5,481,133 A | 1/1996 | Hsu |
| 5,502,333 A | 3/1996 | Bertin et al. |
| 5,521,122 A | 5/1996 | Kuramochi |
| 5,552,633 A | 9/1996 | Sharma |
| 5,561,622 A | 10/1996 | Bertin et al. |
| 5,568,574 A | 10/1996 | Tanguay, Jr. et al. |
| 5,629,563 A | 5/1997 | Takiar et al. |
| 5,633,530 A | 5/1997 | Hsu |
| 5,652,811 A | 7/1997 | Cook et al. |
| 5,682,107 A | 10/1997 | Tavana et al. |
| 5,715,197 A | 2/1998 | Nance et al. |
| 5,804,004 A | 9/1998 | Tuckerman et al. |
| 5,880,598 A | 3/1999 | Duong |
| 5,905,639 A | 5/1999 | Warren |
| 5,914,616 A | 6/1999 | Young et al. |
| 5,990,501 A | 11/1999 | Hiyoshi et al. |
| 6,099,583 A | 8/2000 | Nag |
| 6,114,221 A | 9/2000 | Tonti et al. |
| 6,191,613 B1 | 2/2001 | Schultz et al. |
| 6,255,736 B1 | 7/2001 | Kaneko |
| 6,271,059 B1 | 8/2001 | Bertin et al. |
| 6,337,579 B1 | 1/2002 | Mochida |
| 6,368,930 B1 | 4/2002 | Enquist |
| 6,396,302 B2 | 5/2002 | New et al. |
| 6,400,180 B2 | 6/2002 | Wittig et al. |
| 6,410,431 B2 | 6/2002 | Bertin et al. |

(Continued)

OTHER PUBLICATIONS

Alex Romanelli, "Intel Stacks Flash Deck in its Favor," Electronic News, Apr. 10, 2003, available from Reed Electronics Group @ http://www.e-insite.net/electronicnews/index.asp?layout=article&articleid=CA291318.

(Continued)

*Primary Examiner* — Jason K. Gee
*Assistant Examiner* — Aubrey Wyszynski
(74) *Attorney, Agent, or Firm* — Robert M. Brush; Gerald Chan; Thomas George (57) ABSTRACT

Method and apparatus for communicating data between vertically stacked integrated circuits is described. In some examples, a method of configuring an integrated circuit which is a first die includes obtaining configuration data at configuration resources of the integrated circuit from a non-volatile memory on a second die through an integration tile of the integrated circuit, the second die being vertically stacked on the first die; storing the configuration data in at least one register as the configuration data is obtained by the configuration resources; and loading the configuration data from the at least one register to a configuration memory of the integrated circuit to configure programmable resources of the integrated circuit.

18 Claims, 7 Drawing Sheets

U.S. PATENT DOCUMENTS

| | | | |
|---|---|---|---|
| 6,444,560 | B1 | 9/2002 | Pogge et al. |
| 6,452,259 | B2 | 9/2002 | Akiyama |
| 6,501,663 | B1 | 12/2002 | Pan |
| 6,580,164 | B1 | 6/2003 | Ohie |
| 6,627,531 | B2 | 9/2003 | Enquist |
| 6,849,951 | B1 | 2/2005 | Trimberger et al. |
| 6,870,390 | B1 | 3/2005 | Groen et al. |
| 6,917,219 | B2 | 7/2005 | New |
| 6,975,132 | B2 | 12/2005 | Groen et al. |
| 7,068,072 | B2 | 6/2006 | New et al. |
| 7,671,624 | B1 * | 3/2010 | Walstrum, Jr. ........... 326/38 |
| 7,772,708 | B2 * | 8/2010 | Leddige et al. ........... 257/786 |
| 7,823,117 | B1 * | 10/2010 | Bennett ........... 703/13 |
| 7,930,661 | B1 * | 4/2011 | Trimberger et al. ........... 716/104 |
| 7,973,555 | B1 * | 7/2011 | Trimberger et al. ........... 326/38 |
| 2004/0178819 | A1 * | 9/2004 | New ........... 326/40 |
| 2006/0177064 | A1 * | 8/2006 | Holtzman et al. ........... 380/277 |
| 2009/0257590 | A1 * | 10/2009 | Ding ........... 380/247 |

OTHER PUBLICATIONS

Kaustav Banerjee, Shukri J. Souri, Pawan Kapur and Krishna C. Saraswat, "3-D ICs: A Novel Chip Design for Improving Deep-Submicrometer Interconnect Performance and Systems-on-Chip Integration," IEEE, May 2001, pp. 602-633, vol. 89., No. 5, available from Center for Integrated Systems, Stanford University, Stanford, CA., 94305.

Virtex-II Pro Platform FPGA's Functional Description, Advanced Product Specification, DS083-2, Sep. 27, 2002, pp. 27-71, (v2.2), available from Xilinx, Inc., 2100 Logic Drive, San Jose, CA 95124.

* cited by examiner

METHOD AND APPARATUS FOR COMMUNICATING DATA BETWEEN STACKED INTEGRATED CIRCUITS

FIELD OF THE INVENTION

One or more aspects of the present invention relate generally to semiconductor devices and, more particularly, to a method and apparatus for communicating data between vertically stacked integrated circuits.

BACKGROUND OF THE INVENTION

Programmable logic devices (PLDs) exist as a well-known type of integrated circuit (IC) that may be programmed by a user to perform specified logic functions. There are different types of programmable logic devices, such as programmable logic arrays (PLAs) and complex programmable logic devices (CPLDs). One type of programmable logic device, known as a field programmable gate array (FPGA), is very popular because of a superior combination of capacity, flexibility, time-to-market, and cost.

An FPGA typically includes configurable logic blocks (CLBs), programmable input/output blocks (IOBs), and other types of logic blocks, such as memories, microprocessors, digital signal processors (DSPs), and the like. The CLBs, IOBs, and other logic blocks are interconnected by a programmable interconnect structure. The CLBs, IOBs, logic blocks, and interconnect structure are typically programmed by loading a stream of configuration data (known as a bitstream) into internal configuration memory cells that define how the CLBs, IOBs, logic blocks, and interconnect structure are configured. An FPGA may also include various dedicated logic circuits, such as digital clock managers (DCMs), input/output (I/O) transceivers, boundary scan logic, and the like.

As semiconductor technology has advanced, the amount and speed of logic available on an IC, such as an FPGA, has increased more rapidly than the number and performance of I/O connections. As a result, IC die stacking techniques have received renewed interest to address the interconnection bottleneck of high-performance systems. In stacked IC applications, two or more ICs are stacked vertically and interconnections are made between them.

SUMMARY OF THE INVENTION

An embodiment of the invention relates to a method of configuring an integrated circuit which is a first die. In this embodiment, the method includes obtaining configuration data at configuration resources of the integrated circuit from a non-volatile memory on a second die through an integration tile of the integrated circuit, the second die being vertically stacked on the first die; storing the configuration data in at least one register as the configuration data is obtained by the configuration resources; and loading the configuration data from the at least one register to a configuration memory of the integrated circuit to configure programmable resources of the integrated circuit.

In this embodiment, the portions of the configuration data can comprise frames of the configuration data. The step of storing can comprise: successively storing portions of the configuration data in a first register as the configuration data is obtained by the configuration resources and transferring the portions to a second register. The step of loading can comprise loading the portions of the configuration data from the second register to the configuration memory. The integration tile can include contacts that couple the second die to the first die, where the contacts are obscured by the second die.

An embodiment of the invention relates to a method of processing data in an integrated circuit which is a first die. In this embodiment, the method includes receiving the encrypted data at a receiver implemented on a second die vertically stacked on the first die; decrypting the encrypted data at the receiver to produce the data; and obtaining the data at the integrated circuit from the receiver through an interface tile of the integrated circuit having contacts that couple the second die to the first die, the contacts being obscured by the second die.

In this embodiment, the encrypted data can be received through external contacts of the first die. The data can be obtained by configuration resources of the integrated circuit through the interface tile. The data can comprise configuration data, and the configuration resources can load the data to configuration memory of the integrated circuit to configure programmable resources of the integrated circuit. The data can be obtained at programmable resources of the integrated circuit through an internal configuration access port (ICAP) coupled to the configuration resources.

An embodiment of the invention relate to a semiconductor device. In this embodiment, the semiconductor device includes a second die having a non-volatile memory configured to store configuration data; and a first die, vertically stacked with the second die, the first die is an integrated circuit, where the integrated circuit includes an integration tile configured for communication with the second die and configuration resources for obtaining the configuration data from the non-volatile memory through the integration tile.

In this embodiment, the integrated circuit can include at least one register configured to store the configuration data as the configuration data is received by the configuration resources; and can include configuration memory configured to receive the configuration data from the at least one register under control of the configuration resources. The at least one register can comprise a first register and a second register. The configuration resources can be configured to successively store portions of the configuration data in the first register as the configuration data is obtained and transfer the portions to a second register. The portions of the configuration data can comprise frames of the configuration data. The integration tile can include contacts that couple the second die to the first die, where the contacts are obscured by the second die.

Another embodiment of the invention relate to another semiconductor device. In this embodiment, the semiconductor device includes a second die having a receiver configured to receive encrypted data and decrypt the encrypted data to produce original data; and a first die, vertically stacked with the second die, the first die is an integrated circuit, where the integrated circuit includes an interface tile configured for communication with the second die and configuration resources for obtaining the original data from the receiver through the interface tile.

In this embodiment, the interface tile can include contacts that couple the second die to the first die, where the contacts are obscured by the second die. The first die can include external contacts in communication with the receiver of the second die, where the receiver is configured to obtain the encrypted data through the external contacts. The original data can comprise configuration data, where the configuration resources are configured to load the configuration data to configuration memory of the integrated circuit to configure programmable resources of the integrated circuit. The integrated circuit can include programmable resources and an internal configuration access port (ICAP) coupled to the configuration resources, where the programmable resources are configured to obtain the original data through the ICAP.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1:
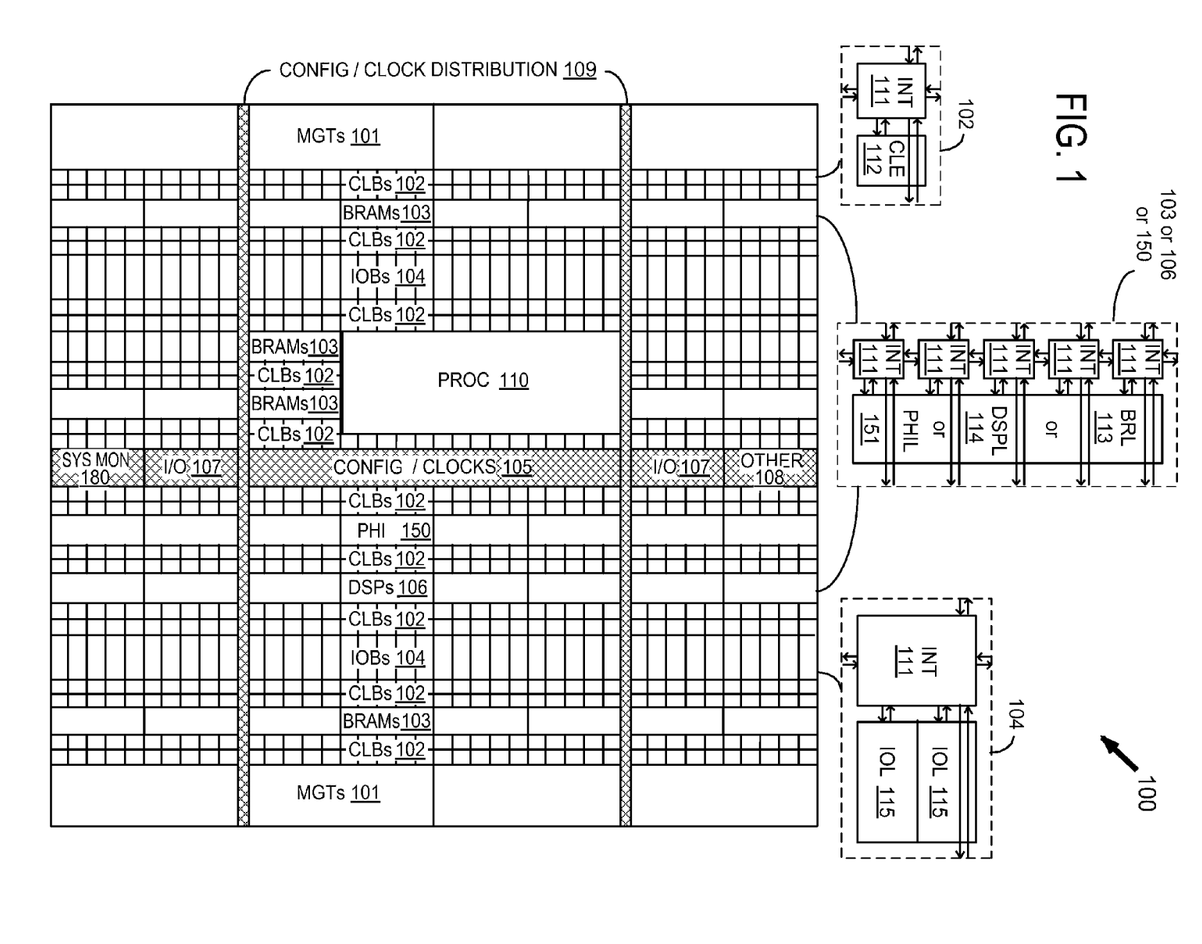
FIG. 1 is a block diagram depicting an exemplary embodiment of an FPGA in accordance with one or more aspects of the invention.

FIG. 1 is a block diagram depicting an exemplary embodiment of an integrated circuit ("IC") including a programmable device such as, e.g., an FPGA 100 in accordance with one or more aspects of the invention. The FPGA 100 includes a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., configuration ports and clock ports), and other programmable logic 108 such as digital clock managers, analog-to-digital converters, system monitoring logic, and so forth. Some FPGAs also include dedicated processor blocks (PROC) 110. The FPGA 100 also includes one or more integration tiles such as, e.g., programmable heterogeneous integration (PHI) tiles 150. In some embodiments, the FPGA 100 includes a plurality of PHI tiles 150 arranged in a column. The PHI tiles 150 facilitate interconnection to one or more other ICs stacked on the die of the FPGA 100. The PHI tiles 150 are discussed in detail below.

In some FPGAs, each programmable tile includes a programmable interconnect element (INT) 111 having standardized connections via routing conductor segments to and from a corresponding interconnect element in each adjacent tile. Therefore, the programmable interconnect elements and routing conductor segments taken together implement the programmable interconnect structure for the illustrated FPGA. The INT 111 also includes the connections to and from the programmable logic element within the same tile, as shown by the examples included at the top of FIG. 1. The INT 111 may also include connections via routing conductor segments to and from a corresponding interconnect element that span multiple columns of logic. That is, routing conductor segments may span a plurality of tiles (e.g., a "hex" line spans six tiles).

For example, a CLB 102 can include a configurable logic element (CLE) 112 that can be programmed to implement user logic plus a single programmable interconnect element (INT) 111. The CLE 112 includes one or more slices of logic (not shown). A BRAM 103 can include a BRAM logic element (BRL) 113 in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL) 114 in addition to an appropriate number of programmable interconnect elements (e.g., four are shown). A PHI tile 150 includes a PHI logic element (PHIL) 151 in addition to an appropriate number of programmable interconnect elements (e.g., four are shown). An IOB 104 can include, for example, two instances of an input/output logic element (IOL) 115 in addition to one instance of the programmable interconnect element (INT) 111. As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA. Configuration information for the programmable logic is stored in configuration memory (shown in FIG. 4). The configuration logic 105 provides an interface to, and loads configuration data to, the configuration memory. A stream of configuration data ("configuration bitstream") may be coupled to the configuration logic 105, which in turn loads the configuration memory Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA, more than one adjacent column of CLBs is typically included wherever the CLBs appear, to facilitate the efficient implementation of user logic. Also, in the embodiment shown, the FPGA architecture 100 also includes a column of PHI tiles 150. Although only a single column of PHI tiles 150 is shown, it is to be understood that the FPGA architecture 100 may generally include one or more columns of PHI tiles 150. Examples of FPGAs that may be used with embodiments of the invention are the VIRTEX 5 FPGAs available from Xilinx, Inc., of San Jose, Calif.

Figure 2:
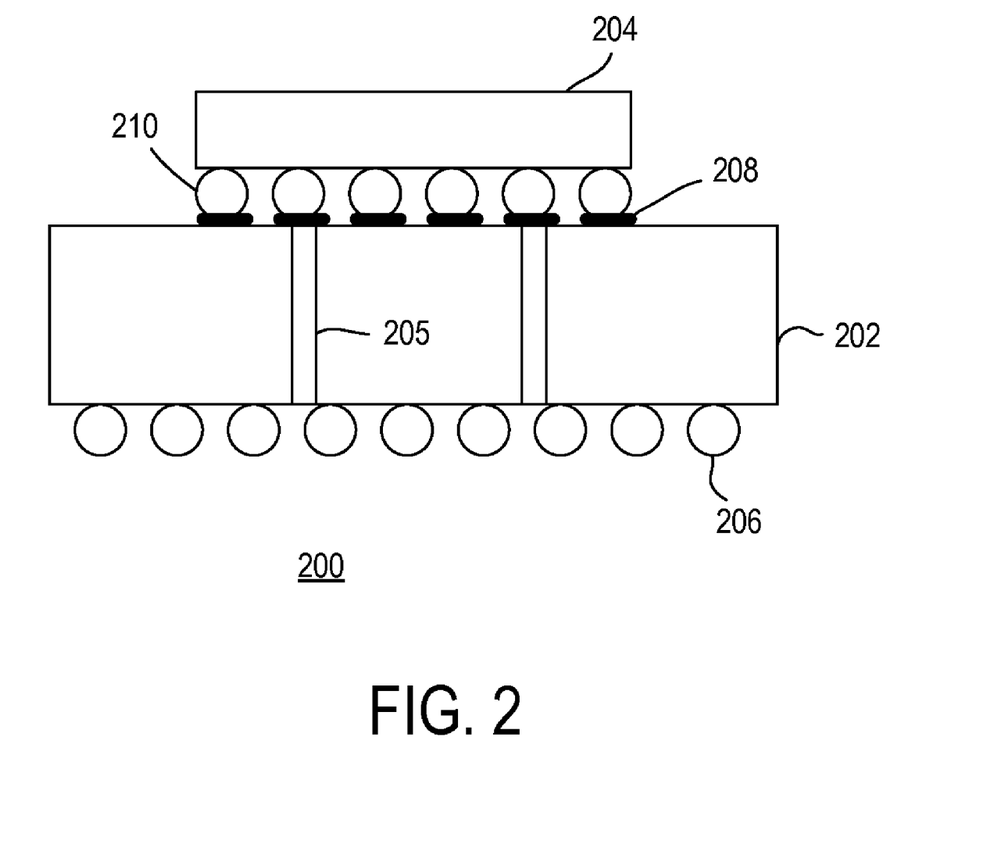
FIG. 2 is a cross-sectional view showing an exemplary embodiment of a semiconductor device in accordance with one or more aspects of the invention.

FIG. 2 is a cross-sectional view showing an exemplary embodiment of a semiconductor device 200 in accordance with one or more aspects of the invention. The semiconductor device 200 includes an IC such as, e.g., an FPGA die 202 and a second die 204. The FPGA die 202 may be configured in accordance with the FPGA architecture 100 shown in FIG. 1. The FPGA die 202 may include contacts 206 that provide an external input/output interface, and contacts 208 that provide an interface to the second die 204. For example, at least a portion of the contacts 206 may be coupled to IOBs 104 on the FPGA die 202. At least a portion of the contacts 208 may be coupled to PHI tiles 150 on the FPGA die 202. Another portion of the contacts 208 may be coupled to a respective portion of the contacts 206 directly through the FPGA die 202 using through silicon vias (TSVs) 205. That is, a portion of the contacts 206 may provide an external interface for the second die 204. The circuitry forming the FPGA architecture 100 is implemented on the face of the FPGA die 202 adjacent to the contacts 206. The TSVs 205 conduct signals from the FPGA circuitry and the contracts 206 to the contacts 208. In general, the second die 204 may comprise any type of digital, analog, or mixed-signal IC. The second die 204 is vertically stacked with the FPGA die 202 or in other arrangements known in the art. In particular, the second die 204 includes contacts 210 coupled to the contacts 208 on the FPGA die 202. In some embodiments, as described below, the second die 204 comprises a non-volatile memory circuit that can store configuration data for the FPGA die 202.

Figure 3:
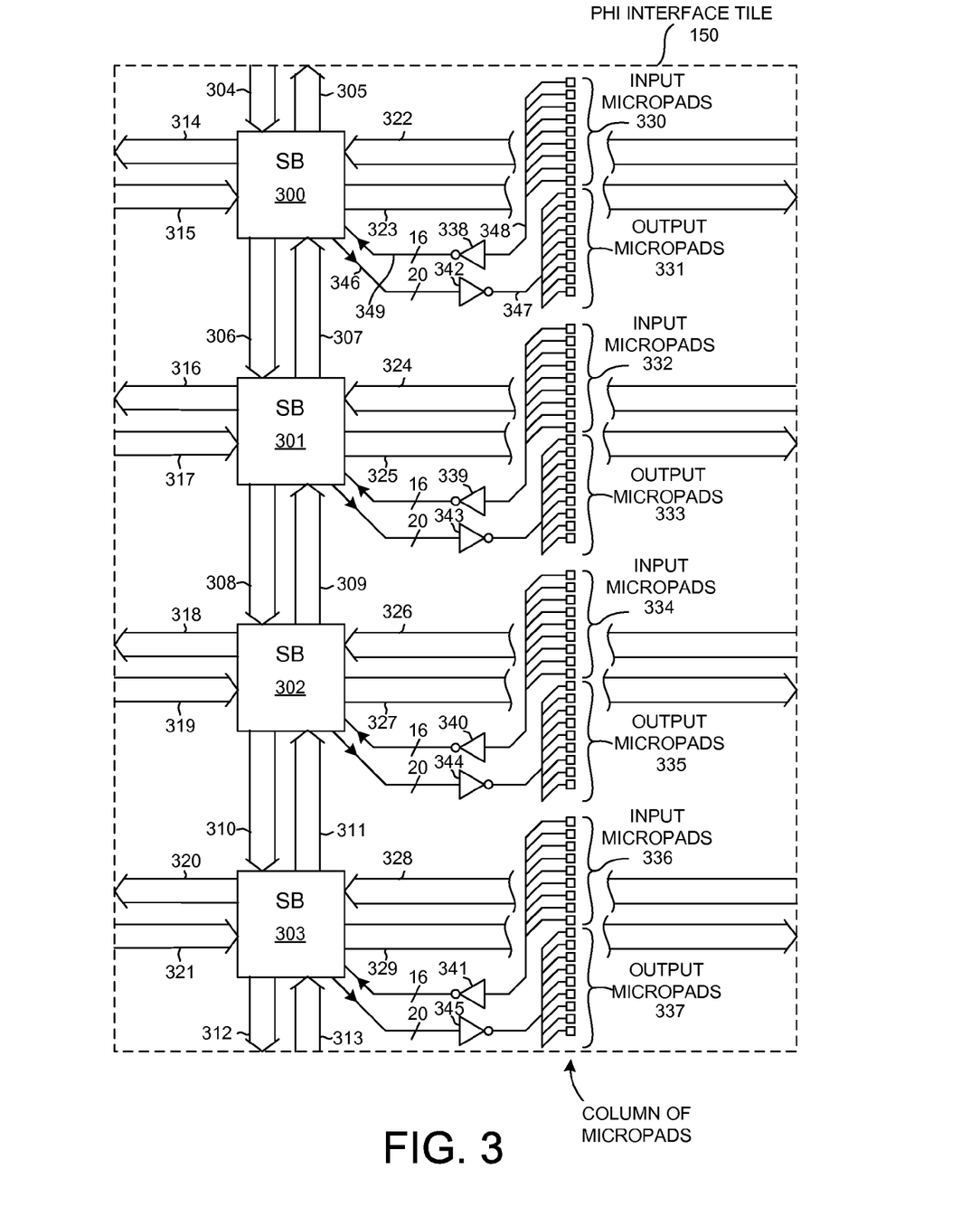
FIG. 3 is a block diagram depicting a PHI tile according to an embodiment of the invention.

FIG. 3 is a block diagram depicting a PHI tile 150 according to an embodiment of the invention. The PHI tile 150 includes a plurality of switch boxes 300-303 and corresponding sets of vertically extending routing conductor segments 304-313 and horizontally extending routing conductor segments 314-329. The switch boxes and the routing conductor segments in the PHI tile 150 can be similarly configured to the switch boxes and routing conductor segments of a BRAM tile 103, for example. The locations where the routing conductor segments meet the four edges of the PHI tile 150 can be the same as the locations where the routing conductor segments of a BRAM tile 103 meet the four edges of the BRAM tile 103. These locations can be made to be the same so that a BRAM tile 103 in an existing FPGA product can be easily replaced with a PHI tile 150 to create a new FPGA product.

The PHI tile 150 further includes a plurality of micropads 330-337 for coupling the FPGA 100 to a second integrated circuit die in stacked relation to FPGA 100 (e.g., the second die 204). The switch box and routing conductor segment technique used in the CLB tiles 102 to communicate signals between CLBs and the programmable interconnect structure of the FPGA can be used in the PHI tile 150 to communicate signals between the second die 204 and the programmable interconnect structure of the FPGA 100. Switch boxes 300-303 of the PHI tile 150 are coupled to their associated micropads 330-337 by sets of input buffers 338-341 and sets of output buffers 342-345. The output buffers provide a measure of electrostatic discharge protection and also serve to increase the drive strength off the FPGA. The input and output buffers also provide a signal polarity inversion function and/or level shifting function where necessary.

If, for example, a signal from the programmable fabric of FPGA 100 is to be driven onto one of micropads 331, then an IMUX within switch box 300 is controlled such that the signal is routed onto the appropriate one of output conductors 346, through the corresponding one of output buffers 342, through the corresponding one of output conductors 347, and to the appropriate one of output micropads 331. In some embodiments, the output buffers convert the signaling voltages so that the voltages on the micropads meet the requirements of the external device that receives the signal from micropad 331.

Similarly, if a signal from one of the input micropads 330 is to be supplied onto the programmable fabric of FPGA 100, then the signal is transferred from the appropriate one of input micropads 330, through the corresponding one of the input conductors 348, through the associated one of the input buffers 338, through the associated one of input conductors 349, and to a data input lead of an OMUX in switch box 300. The OMUX is controlled such that the signal is supplied through the OMUX and is driven onto the appropriate one of the horizontal or vertical routing conductor segments extending from switch box 300. Again, in one embodiment, the input buffer adapts signaling voltages of the signals received at input micropads 330 so that the signals supplied to the FPGA 100 meet the signal voltage requirements of the internal logic of FPGA 100. For further details of an interface tile that can be used with the present invention, the reader is referred to commonly-assigned U.S. Pat. No. 7,068,072, which is incorporated herein by reference.

Figure 4:
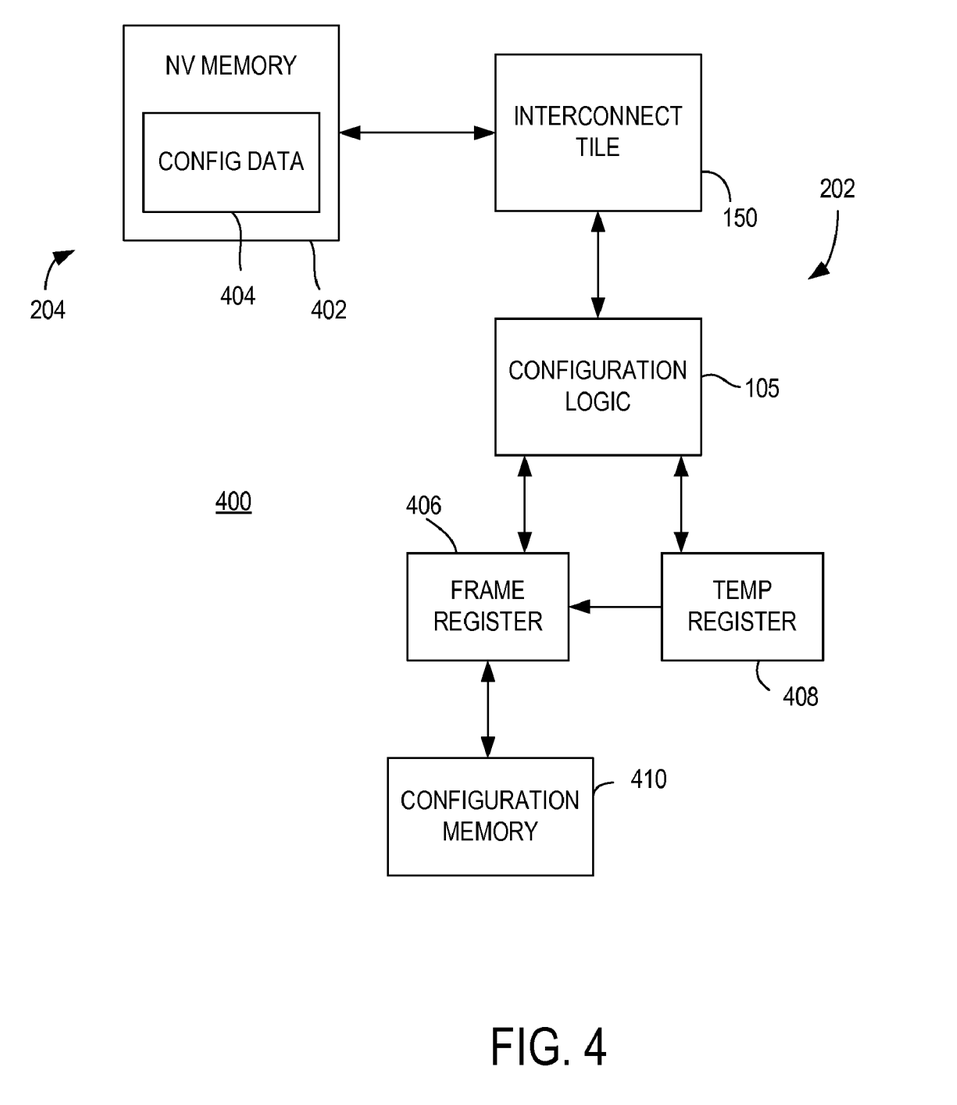
FIG. 4 is a block diagram depicting an exemplary embodiment of an FPGA configuration system according to an embodiment of the invention.

FIG. 4 is a block diagram depicting an exemplary embodiment of an FPGA configuration system 400 according to an embodiment of the invention. The system 400 includes a non-volatile (NV) memory 402, a PHI interconnect tile 150, configuration resources such as e.g. configuration logic 105, a frame register 406, a temporary register 408, and configuration memory 410. The NV memory 402 may be implemented on the second IC die 204, and the PHI tile 150, the configuration logic 105, the frame register 406, the temporary register 408, and the configuration memory 410 may be implemented on the FPGA die 202.

The NV memory 204 may store configuration data 404 to be used to configure the FPGA 100. The configuration logic 105 may communicate with the NV memory 402 via the PHI tile 150 to retrieve the configuration data 404. The temporary register 408 may accumulate the configuration data as it is read by the configuration logic 105 from the NV memory 402. Once a predefined amount of configuration data has been accumulated, the configuration data is transferred from the temporary register 408 to the frame register 406. The configuration logic 105 then causes the configuration data in the frame register 406 to be written to selected memory cells in the configuration memory 410. For example, the configuration data may be organized into frames, and the temporary register 408 may accumulate configuration data until an entire frame is received. In this manner, the configuration logic 105 may read the configuration data 404 from the NV memory 402 and load the configuration data 404 to the configuration memory 410 in order to configure the functionality of the FPGA 100.

Secure data transportation relies on the use of trusted communication devices. If a supposedly secure receive can be replicated or caused to divulge its received information, the entire communication system is compromised, no matter how secure the encryption of data during transmission. For extreme security, the receiver must be designed and manufactured by the user or by a highly trusted agent, and must not be generally available. Thus, any security scheme designed into an FPGA and sold into the broad market typically does not qualify for use in applications requiring the highest level of security.

Figure 5:
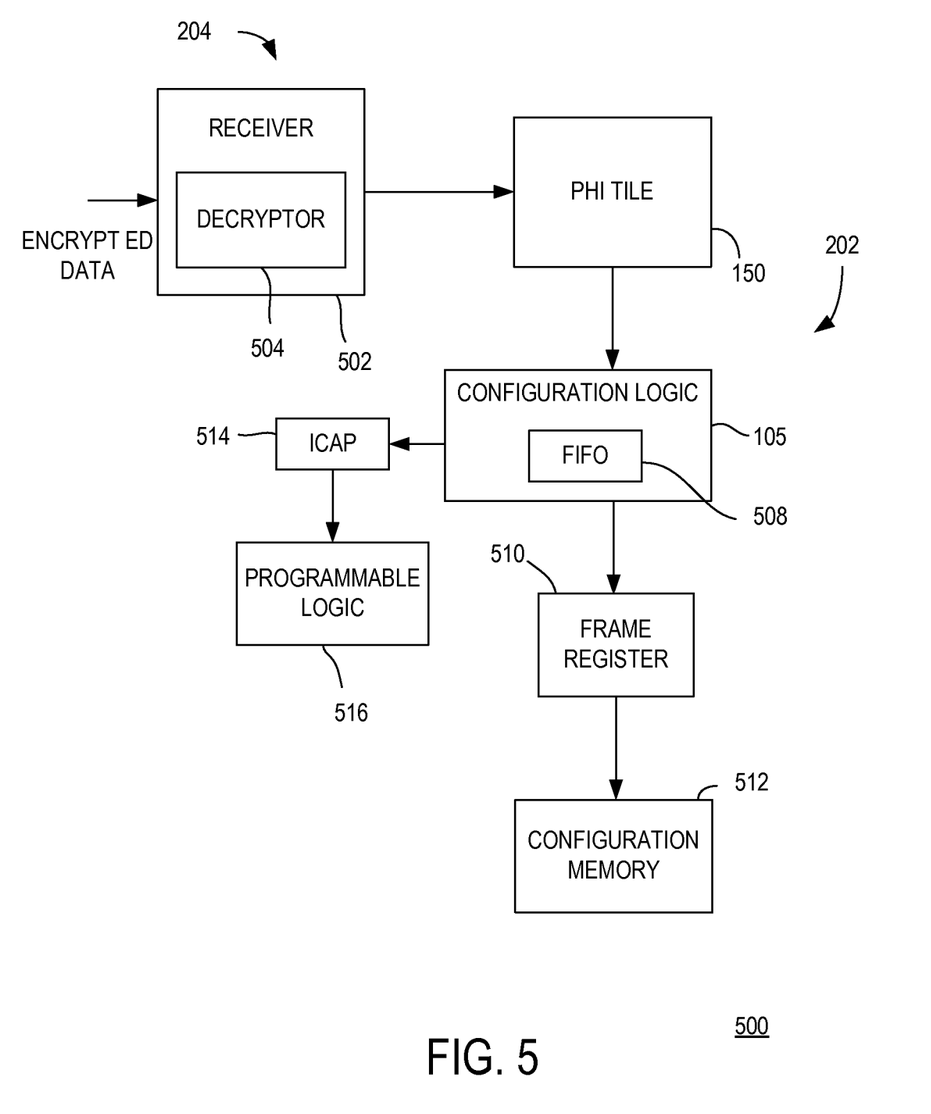
FIG. 5 is a block diagram depicting a secure receiver system according to an embodiment of the invention.

FIG. 5 is a block diagram depicting a secure receiver system 500 according to an embodiment of the invention. The system 500 includes a receiver, a PHI tile 150, configuration logic 105, a frame register 510, configuration memory 512, an internal configuration access port (ICAP) 514, and programmable resources such as e.g. programmable logic 516. The receiver 502 may be implemented on the second IC die 204, and the PHI tile 150, the configuration logic 105, the frame register 510, the configuration memory 512, the ICAP 514, and the programmable logic 516 may be implemented on the FPGA die 202.

The receiver 502 is configured to receive encrypted data. For example, the receiver 502 may be implemented using the second die 204, which includes contacts 210 directly coupled to contacts 206 of the FPGA die 202 so as to receive the encrypted data. The encrypted data may be protected using any type of encryption algorithm. The receiver 502 is configured with a decryptor 504. The decryptor 504 is configured to decrypt the encrypted data and recover original data.

The configuration logic 105 may be configured with a first in first out (FIFO) memory 508. The configuration logic 105 may communicate with the receiver 502 through the PHI tile 150. In particular, the configuration logic 105 may obtain original data as output by the decryptor 504 through the PHI tile 150, which can be stored in the FIFO 508. In some embodiments, the original data may comprise configuration data. The configuration logic 105 can transfer the configuration data from the FIFO 508 to the frame register 510 and then cause the configuration data to be loaded from the frame register 510 to the configuration memory 512. In this manner, a secure configuration scheme is provided where encrypted configuration data is received from a source external to the FPGA. The encrypted configuration data is decrypted by the receiver 502 and obtained by the configuration logic 105 for loading into the configuration memory 512.

In some embodiments, the programmable logic 516 can obtain the original data from the FIFO 508 through the ICAP 514. Thus, a circuit configured in the FPGA 100 may make use of the original data as decrypted by the receiver 502. In this manner, a secure communication scheme is provided where encrypted data is received from a source external to the FPGA. The encrypted data is decrypted by the receiver 502, buffered in the FIFO 508 of the configuration logic 105, and obtained by the programmable logic 516 through the ICAP 514.

Notably, the transfer of data between the receiver 502 and the FPGA 100 is through a contact/micropad that is physically obscured by the second die 204 in which the receiver 502 is implemented. As such, the contacts/micropads that propagate decrypted data cannot be easily probed if at all without destroying the device. Once in the FPGA die 202, the decrypted data is propagated on conductors on the FPGA die 202 and is thus as secure as any other data propagating on any wire/conductor in any IC. In some embodiments, the FPGA 100 may be configured to prevent access to the decrypted data using an external configuration port. For example, the external configuration port of the FPGA 100 may be disabled or otherwise omitted.

Figure 6:
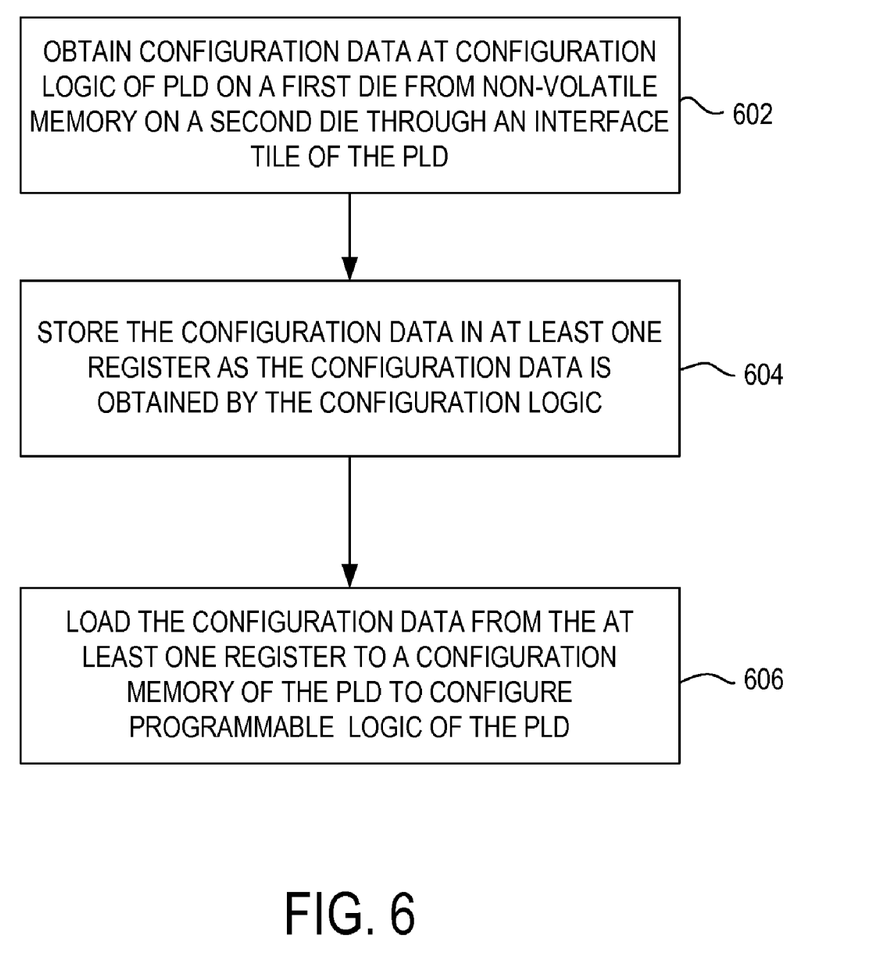
FIG. 6 is a flow diagram depicting a method of configuring a programmable logic device (PLD) according to an embodiment of the invention.

FIG. 6 is a flow diagram depicting a method 600 of configuring an IC such as, e.g., a programmable logic device (PLD) according to an embodiment of the invention. The method 600 begins at step 602, where configuration data is obtained at configuration logic of the PLD on a first die from non-volatile memory on a second die through an interface tile of the PLD. The second die is vertically stacked on the first die. At step 604, the configuration data is stored in at least one register as the configuration data is obtained by the configuration logic. In some embodiments, the configuration data is stored in a first register (e.g., the temporary register 408) and a second register (e.g., the frame register 406). Portions of the configuration data are successively stored in the first register as the configuration data is obtained by the configuration logic and the portions are transferred to the second register. At step 606, the configuration data is loaded from the at least one register to a configuration memory of the PLD to configure programmable logic of the PLD.

Figure 7:
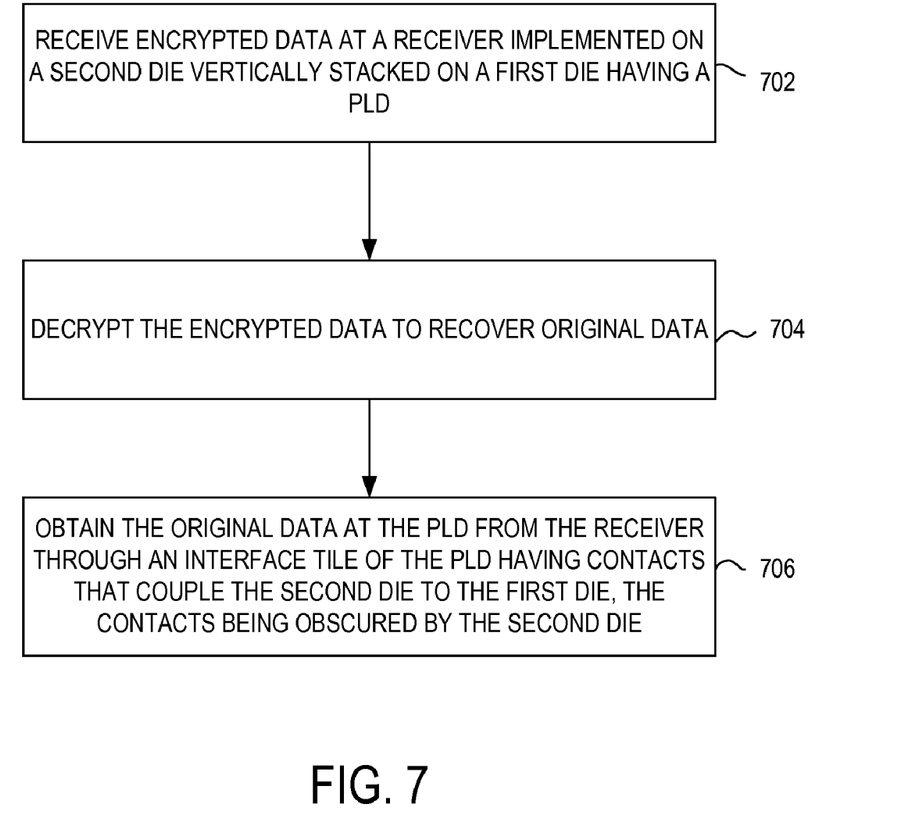
FIG. 7 is a flow diagram depicting a method of processing data in a PLD of a first die according to an embodiment of the invention.

FIG. 7 is a flow diagram depicting a method 700 of processing data in a PLD of a first die according to an embodiment of the invention. At step 702, encrypted data is received at a receiver implemented on a second die vertically stacked on the first die. At step 704, the encrypted data is decrypted to recover original data. At step 706, the original data is obtained at the PLD from the receiver through an interface tile of the PLD having contacts that couple the second die to the first die, the contacts being obscured by the second die.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. A method of configuring an integrated circuit which is a first die, comprising:
    obtaining configuration data at configuration resources of the integrated circuit from a non-volatile memory on a second die through an integration tile of the integrated circuit, the second die being vertically stacked on the first die, the integration tile including contacts that couple the second die to the first die, wherein the contacts are obscured by the second die;
    storing the configuration data in at least one register as the configuration data is obtained by the configuration resources; and
    loading the configuration data from the at least one register to a configuration memory of the integrated circuit to configure programmable resources of the integrated circuit.

2. The method of claim 1, wherein the portions of the configuration data comprise frames of the configuration data.

3. The method of claim 1, wherein the step of storing comprises:
    successively storing portions of the configuration data in a first register as the configuration data is obtained by the configuration resources and transferring the portions to a second register.

4. The method of claim 3, wherein the step of loading comprises:
    loading the portions of the configuration data from the second register to the configuration memory.

5. A method of processing data in an integrated circuit which is a first die, comprising:
    receiving encrypted data at a receiver implemented on a second die vertically stacked on the first die;
    decrypting the encrypted data at the receiver to produce the data; and
    obtaining the data at the integrated circuit from the receiver through an interface tile of the integrated circuit having contacts that couple the second die to the first die, the contacts being obscured by the second die.

6. The method of claim 5, wherein the encrypted data is received through external contacts of the first die.

7. The method of claim 5, wherein the data is obtained by configuration resources of the integrated circuit through the interface tile.

8. The method of claim 7, wherein the data comprises configuration data, and wherein the configuration resources load the data to configuration memory of the integrated circuit to configure programmable resources of the integrated circuit.

9. The method of claim 7, further comprising:
obtaining the data at programmable resources of the integrated circuit through an internal configuration access port (ICAP) coupled to the configuration resources.

10. A semiconductor device, comprising:
a second die having a non-volatile memory configured to store configuration data; and
a first die, vertically stacked with the second die, the first die is an integrated circuit, the integrated circuit including an integration tile configured for communication with the second die and configuration resources for obtaining the configuration data from the non-volatile memory through the integration tile, the integration tile including contacts that couple the second die to the first die, wherein the contacts are obscured by the second die.

11. The semiconductor device of claim 10, wherein the integrated circuit further comprises:
at least one register configured to store the configuration data as the configuration data is received by the configuration resources; and
configuration memory configured to receive the configuration data from the at least one register under control of the configuration resources.

12. The semiconductor device of claim 11, wherein the at least one register comprises a first register and a second register, and wherein the configuration resources are configured to successively store portions of the configuration data in the first register as the configuration data is obtained and transfer the portions to a second register.

13. The semiconductor device of claim 10, wherein the portions of the configuration data comprise frames of the configuration data.

14. A semiconductor device, comprising:
a second die having a receiver configured to receive encrypted data and decrypt the encrypted data to produce original data; and
a first die, vertically stacked with the second die, the first die is an integrated circuit, the integrated circuit including an interface tile configured for communication with the second die and configuration resources for obtaining the original data from the receiver through the interface tile.

15. The semiconductor device of claim 14, wherein the interface tile includes contacts that couple the second die to the first die, wherein the contacts are obscured by the second die.

16. The semiconductor device of claim 14, wherein the first die includes external contacts in communication with the receiver of the second die, and wherein the receiver is configured to obtain the encrypted data through the external contacts.

17. The semiconductor device of claim 14, wherein the original data comprises configuration data, and wherein the configuration resources are configured to load the configuration data to configuration memory of the integrated circuit to configure programmable resources of the integrated circuit.

18. The semiconductor device of claim 14, wherein the integrated circuit includes programmable resources and an internal configuration access port (ICAP) coupled to the configuration resources, and wherein the programmable resources are configured to obtain the original data through the ICAP.

* * * * *